United States Patent
Kong et al.

(10) Patent No.: US 11,226,991 B2
(45) Date of Patent: Jan. 18, 2022

(54) INTEREST TAG DETERMINING METHOD, COMPUTER DEVICE, AND STORAGE MEDIUM

(71) Applicant: Tencent Technology (Shenzhen) Company Limited, Guangdong (CN)

(72) Inventors: Hang Kong, Guangdong (CN); Hao Ye, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 384 days.

(21) Appl. No.: 16/452,914

(22) Filed: Jun. 26, 2019

(65) Prior Publication Data

US 2019/0317950 A1    Oct. 17, 2019

Related U.S. Application Data

(63) Continuation of application No. PCT/CN2018/074564, filed on Jan. 30, 2018.

(30) Foreign Application Priority Data

Feb. 10, 2017 (CN) .......................... 201710074401.5

(51) Int. Cl.
  *G06F 16/28* (2019.01)
(52) U.S. Cl.
  CPC .................................. *G06F 16/285* (2019.01)
(58) Field of Classification Search
  None
  See application file for complete search history.

(56) References Cited

U.S. PATENT DOCUMENTS 10,242,019 B1 *   3/2019   Shan ....................... G06N 7/005
2008/0275861 A1   11/2008  Baluja et al.
(Continued)

FOREIGN PATENT DOCUMENTS

CN          102902681 A      1/2013
CN          102984049 A      3/2013
(Continued)

OTHER PUBLICATIONS

Chinese Office Action for Chinese Patent Application 2017100744015 dated Apr. 27, 2021, including an English Concise Explanation (10 pages).

(Continued)

*Primary Examiner* — Scott A. Waldron
(74) *Attorney, Agent, or Firm* — Crowell & Moring LLP (57) ABSTRACT

Disclosed are interest tag determining method and device for accurately promoting information for users in a group based on interest tags of the group. This includes obtaining a group identifier and a corresponding group name, obtaining user identifiers corresponding to the group identifier and first user contents of the user identifiers, concatenating the first user contents of the user identifiers corresponding to the group identifier to obtain a first group content of the group identifier, calculating probabilities that the first group content is under the topic identifiers, and determining interest tags of the group identifier according to the probabilities that the first group content is under the topic identifiers and an association relationship between the topic identifiers and the interest tags that is determined through pre-training.

15 Claims, 5 Drawing Sheets

(56) References Cited

U.S. PATENT DOCUMENTS

2015/0370797 A1* 12/2015 Mishra .................... H04L 51/16
707/748
2018/0240135 A1* 8/2018 Reeves .............. G06Q 30/0201
2019/0340670 A1* 11/2019 Tomobe ................ G06F 16/285

FOREIGN PATENT DOCUMENTS

| | | | |
|---|---|---|---|
| CN | 104035995 | A | 9/2014 |
| CN | 104038517 | A | 9/2014 |
| CN | 104915359 | A | 9/2015 |
| CN | 105512245 | A | 4/2016 |
| CN | 105573995 | A | 5/2016 |
| CN | 106228453 | A | 12/2016 |
| CN | 108335165 | A | 7/2018 |

OTHER PUBLICATIONS

International Search Report with English Translation and Written Opinion for International Application No. PCT/CN2018/074564 dated May 7, 2018; 10 pages.

* cited by examiner

INTEREST TAG DETERMINING METHOD, COMPUTER DEVICE, AND STORAGE MEDIUM

CROSS-REFERENCE TO RELATED APPLICATION(S)

This application is a continuation of International Patent Application No. PCT/CN2018/074564, filed Jan. 30, 2018, which claims priority to Chinese Patent Application No. 2017100744015, filed with the Chinese Patent Office on Feb. 10, 2017, all of which are incorporated by reference herein in their entirety.

FIELD OF THE TECHNOLOGY

This application relates to the field of Internet technologies, and in particular, to an interest tag determining method, a computer device, and a storage medium.

BACKGROUND OF THE DISCLOSURE

Learning of interest of a user is very important for an information provider. After learning of the interest of the user, the information provider sets interest tags for the user, to accurately provide an information service to the user, for example, provide information about a recommended commodity to the user.

Some instant messaging tools provide a group function. When a group is created, a group ID is randomly allocated to the group. The group may be successfully created without needing a creator to select a tag such as interest and a hobby. Creators of some groups set tags. However, the tags may be randomly set to be words not having actual meaning, for example, numbers, person names, and geography names. Consequently, an amount of effective information related to each of the groups is small, it is difficult to directly infer a common interest and a common hobby of group members by using a group name and an interest and hobby tag, and further information cannot be accurately promoted for the user.

SUMMARY

According to various embodiments provided in this application, an interest tag determining method, a computer device, and a storage medium are provided.

An interest tag determining method, including: obtaining, by a computer device, a group identifier and a corresponding group name; obtaining, by the computer device, user identifiers corresponding to the group identifier and first user contents of the user identifiers, the first user content including a content obtained by concatenating group names corresponding to the user identifier; concatenating, by the computer device, the first user contents of the user identifiers corresponding to the group identifier, to obtain a first group content of the group identifier; calculating, by the computer device according to topic identifiers and a topic-word distribution result that are determined through pre-training, probabilities that the first group content is under the topic identifiers; and determining, by the computer device, interest tags of the group identifier according to the probabilities that the first group content is under the topic identifiers and an association relationship between the topic identifiers and the interest tags that is determined through pre-training.

A computer device, including a memory and a processor, the memory storing computer readable instructions, and the computer readable instructions, when executed by the processor, causing the processor to perform the following steps: obtaining a group identifier and a corresponding group name; obtaining user identifiers corresponding to the group identifier and first user contents of the user identifiers, the first user content including a content obtained by concatenating group names corresponding to the user identifier; concatenating the first user contents of the user identifiers corresponding to the group identifier, to obtain a first group content of the group identifier; calculating, according to topic identifiers and a topic-word distribution result that are determined through pre-training, probabilities that the first group content is under the topic identifiers; and determining interest tags of the group identifier according to the probabilities that the first group content is under the topic identifiers and an association relationship between the topic identifiers and the interest tags that is determined through pre-training.

One or more non-volatile storage media storing computer readable instructions, the computer readable instructions, when executed by one or more processors, causing the one or more processors to perform the following steps: obtaining a group identifier and a corresponding group name; obtaining user identifiers corresponding to the group identifier and first user contents of the user identifiers, the first user content including a content obtained by concatenating group names corresponding to the user identifier; concatenating the first user contents of the user identifiers corresponding to the group identifier, to obtain a first group content of the group identifier; calculating, according to topic identifiers and a topic-word distribution result that are determined through pre-training, probabilities that the first group content is under the topic identifiers; and determining interest tags of the group identifier according to the probabilities that the first group content is under the topic identifiers and an association relationship between the topic identifiers and the interest tags that is determined through pre-training.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific implementations described herein are merely used for explaining this application but are not intended to limit the protection scope of this application.

Figure 1:
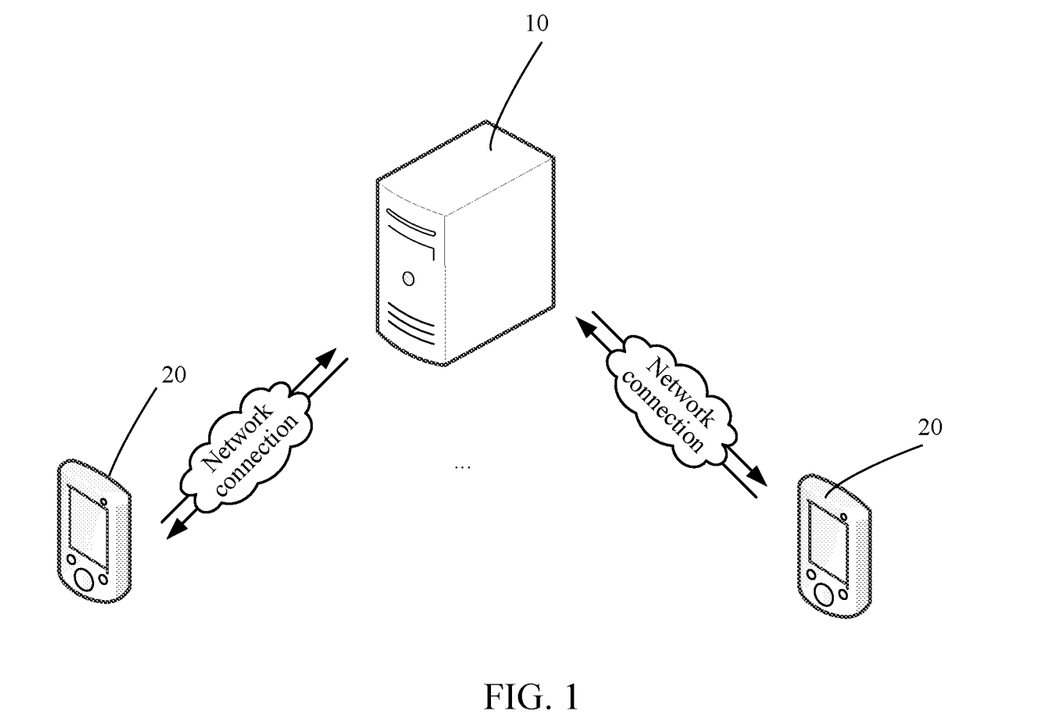
FIG. 1 is a schematic diagram of an application environment of an interest tag determining method according to an embodiment.

FIG. 1 is a schematic diagram of an application environment of an interest tag determining method according to an embodiment. As shown in FIG. 1, the application environment includes a computer device and a user terminal. In this embodiment, an example in which the computer device is served as a server is used for description. The server is connected to a user terminal 20 by using a network. A user applies to join a group on a server 10 by using the user terminal 20. The server 10 establishes a correspondence between a group identifier of the group and a user identifier of the user. The server 10 obtains a first group content corresponding to the group identifier through concatenating according to first user content of each member in the group. The first user content includes a content obtained by concatenating all group names corresponding to the user identifier. The server 10 calculates, according to topic identifiers and a topic-word distribution result that are determined through pre-training, probabilities that the first group content is under the topic identifiers, and determines interest tags of the group identifier according to the probabilities that the first group content is under the topic identifiers and an association relationship between the topic identifiers and the interest tags that is determined through pre-training. The server 10 adds interest tags for each user in the group according to the tags of the group. Finally, interest tags of the user include tags of each group to which the user belongs. The server 10 may recommend related service information to the user according to the interest tags of the user, and send the service information to the user terminal 20 corresponding to the user identifier by using the network.

Figure 2:
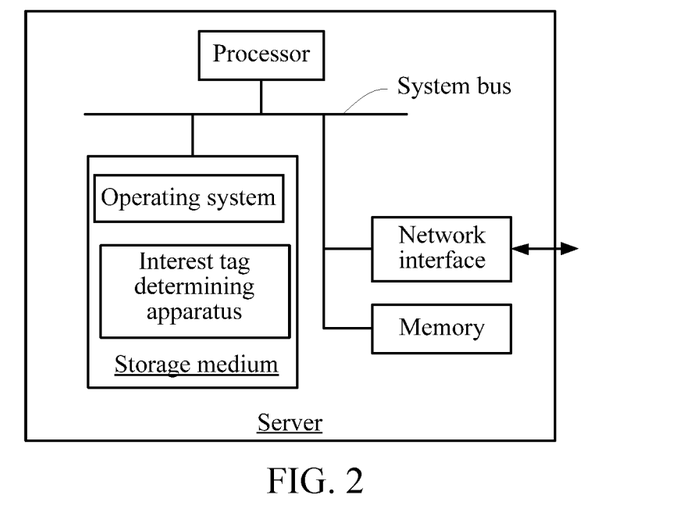
FIG. 2 is a schematic diagram of an inner structure of a computer device according to an embodiment.

FIG. 2 is a schematic diagram of an inner structure of a computer device according to an embodiment. As shown in FIG. 2, the computer device includes a processor, a memory, and a network interface that are connected by using a system bus. The memory includes a non-volatile storage medium and an internal memory. The non-volatile storage medium of a server may store an operating system and computer readable instructions. The computer readable instructions, when executed, may cause the processor to perform an interest tag determining method. The processor is configured to provide computing and control capabilities and supports running of the entire server. The internal memory of the server may store computer readable instructions. The computer readable instructions, when executed by the processor, may cause the processor to perform an interest tag determining method. A network interface of the server communicates with a user terminal by using network, for example, receives a group joining request sent by the user terminal to the server, and recommends service information corresponding to interest tags to the user terminal. A person skilled in the art may understand that, the structure shown in FIG. 2 is only a block diagram of a partial structure related to the solution in this application, and does not constitute a limit to the terminal to which the solution in this application is applied. Specifically, the computer device may include more components or fewer components than those shown in the figure, or some components may be combined, or a different component deployment may be used.

Figure 3:
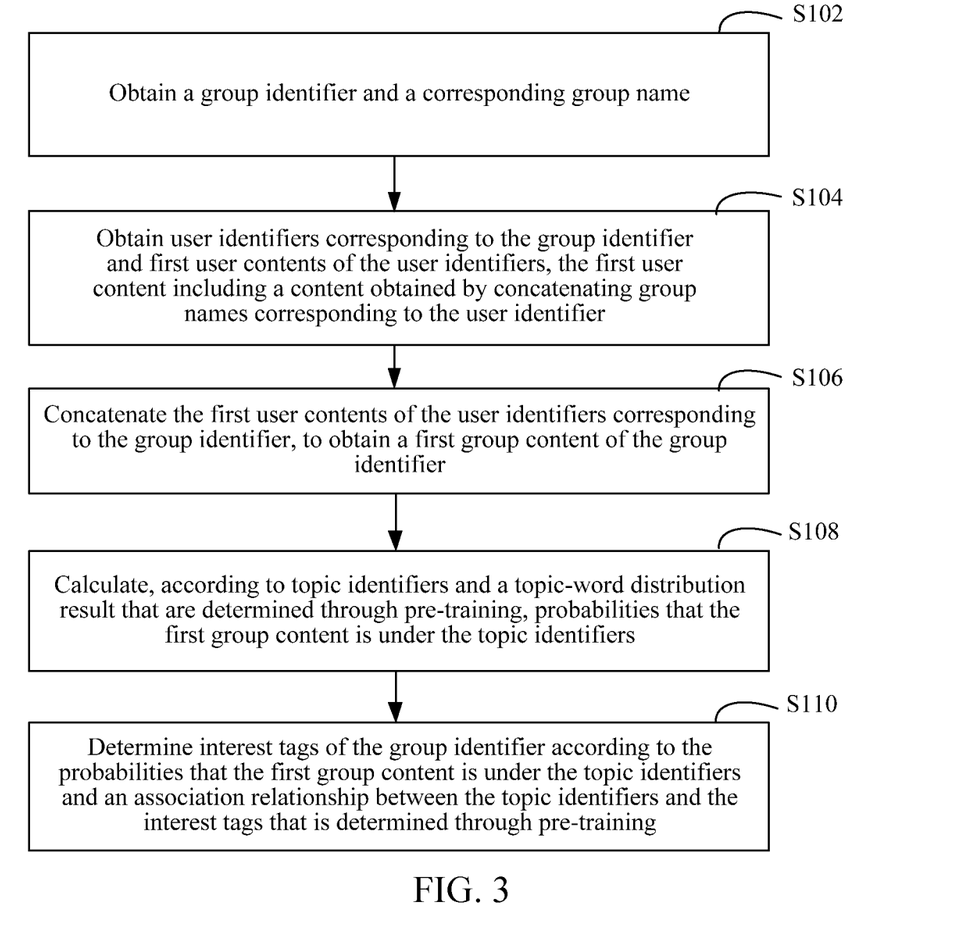
FIG. 3 is a flowchart of an interest tag determining method according to an embodiment.

In an embodiment, an interest tag determining method is provided. As shown in FIG. 3, the interest tag determining method is performed on the computer device shown in FIG. 1. The method includes the following steps:

S102: Obtain a group identifier and a corresponding group name.

The group identifier is used to distinguish between different groups. The group identifier may be a group ID. The group name is a name that is set by a creator or a group administrator for a group and that is used for representing a group member relationship or a group purpose. The group ID of the group corresponds to the group name. For a group for which no group name is set, a corresponding group name is none, or a default group name of the group may be a group ID.

A manner of triggering the obtaining a group identifier and a corresponding group name may be that when it is detected that a new group is established, or when it is detected that a new member joins a group or a member exits the group, or when it is detected that a specified time of updating interest tags reaches. In a specific implementation, a system is set to regularly update interest tags of a group automatically, for example, automatically update the interest tags every month. When it is detected that the time of automatically updating reaches, the group identifier and the corresponding group name are obtained.

S104: Obtain user identifiers corresponding to the group identifier and first user contents of the user identifiers, the first user content including a content obtained by concatenating group names corresponding to the user identifier.

The group identifier of the group corresponds to the user identifiers of members in the group. The user identifier may be a user ID. The user identifiers corresponding to the group identifier include a user identifier of each member joining the group in the group. Each user identifier has corresponding first user content. The first user content includes the content obtained by concatenating the group names corresponding to the user identifier. The group names corresponding to the user identifier are group names of all group identifiers corresponding to the user identifier, and may be understood as group names of all groups that a user joins.

For example, a group 1 includes a user 1 to a user N. The user 1 joins the group 1, a group 2, and a group 3. A first user content of the user 1 is a content obtained by concatenating group names of all the groups (the group 1, the group 2, and the group 3) that the user 1 joins. If the user 1 joins a plurality of interest groups related to table tennis, the groups certainly have group names having actual meaning. Therefore, the first user content obtained through concatenating may represent interest of the user 1 in a sense.

S106: Concatenate the first user contents of the user identifiers corresponding to the group identifier, to obtain a first group content of the group identifier.

Specifically, a first group content of a group includes first user contents of all users corresponding to a group identifier, namely, first user contents of all users joining the group. A first user content of a user includes group names of all groups that the user joins. The first group content includes group names of all groups that each user in the group joins.

The group 1 is used as an example. A first group content corresponding to the group 1 is a content obtained by concatenating first user contents of the user 1 to the user N in the group 1. A first group content of a group identifier may be used for representing interest of a group. For example, if the group 1 is a table tennis hobby group, most users in the group are certainly users fond of table tennis. In the users fond of table tennis, text of first user contents of most users certainly include words related to table tennis. Therefore, in the first group content obtained by concatenating the first user contents of all the members in the group 1, a proportion of the words related to table tennis is relatively large.

S108: Calculate, according to topic identifiers and a topic-word distribution result that are determined through pre-training, probabilities that the first group content is under the topic identifiers.

The topic identifiers may be IDs of topics. The topic identifiers and the topic-word distribution result are obtained through pre-training. A specific training manner may be training by using a topic model. The topic-word distribution result is a probability of each word distributed under each topic. Probabilities that the first group content is under the topic identifiers are calculated by using the topic identifiers and the topic-word distribution result that are determined through pre-training.

S110: Determine interest tags of the group identifier according to the probabilities that the first group content is under the topic identifiers and an association relationship between the topic identifiers and the interest tags that is determined through pre-training.

The interest tags are used for representing content in which group members may be interested. The association relationship between the topic identifiers and the interest tags is also determined through pre-training. Specifically, the interest tags may be determined according to a word distribution result under each topic identifier. The interest tags of the group identifier corresponding to the first group content can be determined according to the probabilities that the first group content is under the topic identifiers and a relationship between the topic identifiers and the interest tags.

In a specific implementation, according to the probabilities that the first group content is under the topic identifiers, an interest tag corresponding to a topic identifier having a highest probability is used as an interest tag of the group identifier corresponding to the first group content. It may be understood that the interest tag of the group identifier may be used as an interest tag of each member in the group.

In the foregoing interest tag determining method, the group names of all the group identifiers corresponding to the user identifier are concatenated to obtain the first user content corresponding to the user identifier. The first user contents of all the user identifiers corresponding to the group identifier are concatenated to obtain the first group content. The first group content is obtained by concatenating the group names of all the groups that each member in the group joins, thereby enlarging an amount of information used for representing a group content. Based on this, based on the group content after the amount of information is enlarged, the probabilities that the first group content is under the topic identifiers are calculated by using the topic identifiers and the topic-word distribution result that are determined through pre-training, and a range of topic identifiers to which the group may belong is widened. Further, according to the calculated probabilities and the association relationship between the topic identifiers and the interest tags that is determined through pre-training, the interest tags of the group identifier are accurately determined in a plurality of possible topics. The interest tags may be representative of interest content of the group. Further, information is accurately promoted for users in the group based on the interest tags of the group.

Figure 4:
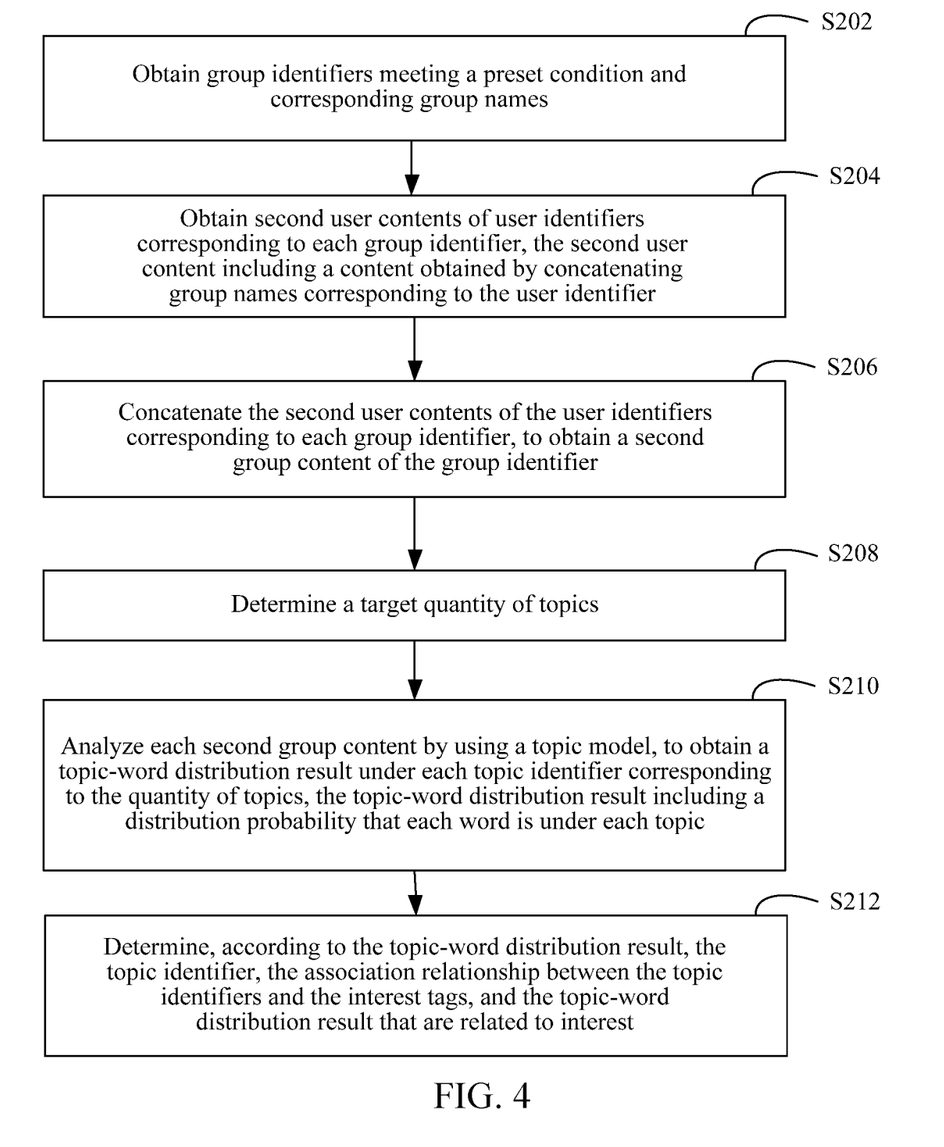
FIG. 4 is a flowchart of steps of determining topic identifiers, a topic-word distribution result, and an association relationship between the topic identifiers and interest tags according to an embodiment.

In an embodiment, a step of determining the topic identifiers, the topic-word distribution result, and the association relationship between the topic identifiers and the interest tags is further included. The step is a process of performing topic model training on existing group content. As shown in FIG. 4, the step includes the following steps:

S202: Obtain group identifiers meeting a preset condition and corresponding group names.

An amount of effective information obtainable from the first group content is related to the respective group name. Setting a substantial group name for the group can add the amount of effective information of the first group content. For example, if the group name is set to be table tennis communication, it indicates that interest of group members is related to table tennis. However, if no group name is set for the group, an amount of interest-related information cannot be obtained by using the group name.

The amount of effective information of the first group content is related to a quantity of group members. In the first group content, the first user contents of all the members in the group are concatenated. Therefore, a larger quantity of group members indicates a larger amount of effective information of the first group content.

To ensure an amount of effective information of a group content, the preset condition may be related to the group name and/or the quantity of group members. In this embodiment, the preset condition is that the quantity of group members is greater than 5 and a group name is set for the group. The group identifiers meeting the preset condition are sifted out from a system, and the corresponding group names are obtained.

S204: Obtain second user contents of user identifiers corresponding to each group identifier, the second user content including a content obtained by concatenating group names corresponding to the user identifier.

The second user content herein is used for distinguishing from the first user content. The essence of the second user content is still a content obtained by concatenating group names corresponding to a user identifier. The first user content and the second user content are used for representing user content in two stages. The first user content is a user content, of each member in a specific group, obtained when an interest tag is determined for the group. The second user content is a user content, of each member in a group meeting a requirement, obtained from the group in a topic model training stage. The second user content and the first user content are obtained in the same manner. Specifically, the second user content includes a content obtained by concatenating group names of all groups that a user joins.

S206: Concatenate the second user contents of the user identifiers corresponding to each group identifier, to obtain a second group content of the group identifier.

The second group content herein is used for distinguishing from the first group content. The essence of the second group content is still a content obtained by concatenating user contents corresponding to user identifiers in a group. The first group content and the second group content are used for representing group content in two stages. The first group content is a group content of a specific group that is obtained when an interest tag is determined for the group. The second group content is a group content, of a group meeting a requirement, obtained from the group in the topic model training stage. The second group content and the first group content are obtained in the same manner. Specifically:

The second group content includes contents obtained by concatenating the second user contents of all the members in the group.

S208: Determine a target quantity of topics.

The target quantity of topics is a quantity of topics that needs to be obtained by training the topic model. In this embodiment, a Latent Dirichlet Allocation (LDA) document topic may be used to generate a model for training. The step of determining a target quantity of topics includes: obtaining preset quantities of topics; calculating, according to the quantities of topics and a quantity of words in all the second group contents, a perplexity value corresponding to each quantity of topics; and determining a quantity of topics that corresponds to a smallest perplexity value as the target quantity of topics.

In an embodiment, before the step of determining a target quantity of topics, a step of preprocessing all the second group contents is further included. The preprocessing includes performing word segmentation and stop-word removing processing on all the second group contents, retaining only notional words, and using the notional words of all the second group contents that are obtained after preprocessing as a training set.

In a specific embodiment, when LDA is used to train all the second group contents, three quantities of topics are preset, and are respectively 1000, 2000, and 3000. A perplexity value corresponding to each preset quantity of topics is calculated.

Specifically, a calculation formula of the perplexity value is as follows:

$$\text{perplexity} = 2^{-\frac{1}{N}\Sigma_N \log(p(w))}.$$

N is a quantity of notional words in all training sets, $$p(w) = \sum_k p(k|d)p(w|k),$$

p(k|d) represents topic-document distribution, and p(w|k) represents topic-word distribution.

The preset quantity of topics that corresponds to the smallest perplexity value is determined as the target quantity of topics. In this embodiment, when the preset quantity of topics is 2000, a perplexity value is the smallest, and the determined target quantity of topics is 2000.

S210: Analyze each second group content by using a topic model, to obtain a topic-word distribution result under each topic identifier corresponding to the quantity of topics, the topic-word distribution result including a distribution probability that each word is under each topic.

In this embodiment, all the second group contents are analyzed by using the LDA model, to obtain topic-word distribution results under 2000 topic identifiers. The topic-word distribution result includes a distribution probability that each word is under each topic. In other embodiments, other topic analysis models, for example, a PLSA topic model, may also be used for implementation.

S212: Determine, according to the topic-word distribution result, the topic identifiers, the association relationship between the topic identifiers and the interest tags, and the topic-word distribution result that are related to interest.

The LDA model is used to analyze all the second group contents, to obtain 2000 topic identifiers, namely, topic IDs, and the probability of word distribution under each topic identifier. A topic ID does not have actual meaning. However, real meaning of each topic can be determined according to a word having a largest distribution probability under each topic identifier. In this embodiment, a tag is manually set for each topic identifier according to first N words having largest distribution probabilities under the topic identifier. However, the tag of each topic is not necessarily related to interest. 206 interest-related topic identifiers are finally obtained through sifting, and are marked with interest tags of the topic identifiers, and a topic-word distribution result corresponding to each topic identifier of an interest-related topic is obtained.

In this embodiment, group contents of groups meeting the condition are trained. The group content is obtained by concatenating user contents of all users in each group, and the user content is obtained by concatenating group names of all groups that a user joins. Through manual marking and sifting, an interest-related topic is selected and is marked with an interest tag Therefore, the determining, according to the topic-word distribution result, the topic identifiers, the association relationship between the topic identifiers and the interest tags, and the topic-word distribution result that are related to interest has actual reference meaning for topic inferring of an group identifier.

In another embodiment, the step of calculating, according to topic identifiers and a topic-word distribution result that are determined through pre-training, probabilities that the first group content is under the topic identifiers includes: sampling, according to the topic identifiers and the topic-word distribution result, a topic identifier to which each word in the first group content belongs, and counting a quantity of times that each word appears under each topic identifier, to obtain the probabilities that the first group content is under the topic identifiers.

Specifically, the calculating probabilities that the first group content is under the topic identifiers is a process of inferring a topic of the first group content by using a training result of the topic model. Specifically, the following formulas are used for calculation:

$$p(z_{m',n'} = k \mid \vec{z}_{-,(m',n')}, w_{m',n'} = t, \vec{w}_{-,(m',n')}; n_k^{(t)}) =$$

$$\frac{n_k^{(t)} + n_{k,-,(m',n')}^{(t)} + \beta_t}{\sum_{i=1}^{V}(n_k^{(t)} + n_{k,-,(m',n')}^{(t)} + \beta_t)} \cdot \frac{n_{m',-,(m',n')}^{(k)} + \alpha_k}{\sum_{k=1}^{K}(n_{m',-,(m',n')}^{(k)} + \alpha_k)}, \text{ and}$$

$$\vartheta_{m',k} = \frac{n_{m'}^{(k)} + \alpha_k}{\sum_{k=1}^{k}(n_{m'}^{(k)} + \alpha_k)}.$$

$n_{k,\neg(m'n')}^{(t)}$ represents a quantity of times that a word t appears under a topic k in a first group content m' other than a current word t (an $n^{th}$ word in the first group content m'), $n_{m,\neg(m'n')}^{(t)}$ represents a quantity of times that the word t appears under the topic k in a new m' other than the current word t, $\theta_{m,k}$ is distribution of k topics in the first group content m', and $\alpha_k$ is a parameter of the LDA model.

In this embodiment, the training result of the topic model is used to infer the topic of the first group content, to obtain the probabilities that the first group content is under the topic identifiers, and further determine an interest topic corresponding to the group according to the probability under the topic identifier.

In another embodiment, the step of determining interest tags of the group identifier according to the probabilities that the first group content is under the topic identifiers and an association relationship between the topic identifiers and the interest tags that is determined through pre-training includes: extracting topic identifiers corresponding to first N largest probabilities, obtaining interest tags related to the topic identifiers corresponding to the first N largest probabilities, establishing a correspondence between the N interest tags and the group identifier, and determining the N interest tags as the interest tags of the group identifier.

An interest tag of a group is related to probabilities that a corresponding first group content is under topic identifiers, may correspond to an interest tag of a topic identifier having a highest probability, or may correspond to interest tags of first N topic identifiers having highest probabilities. In a specific embodiment, after the probabilities that the first group content is under the topic identifiers is calculated, the topic identifiers corresponding to the first N largest probabilities are extracted, the interest tags related to the topic identifiers corresponding to the first N largest probabilities are obtained, the correspondence between the N interest tags and the group identifier is established, and the N interest tags are determined as the interest tags of the group identifier. A value of N may be set according to a requirement. To be specific, a group may have a plurality of interest tags.

Figure 5:
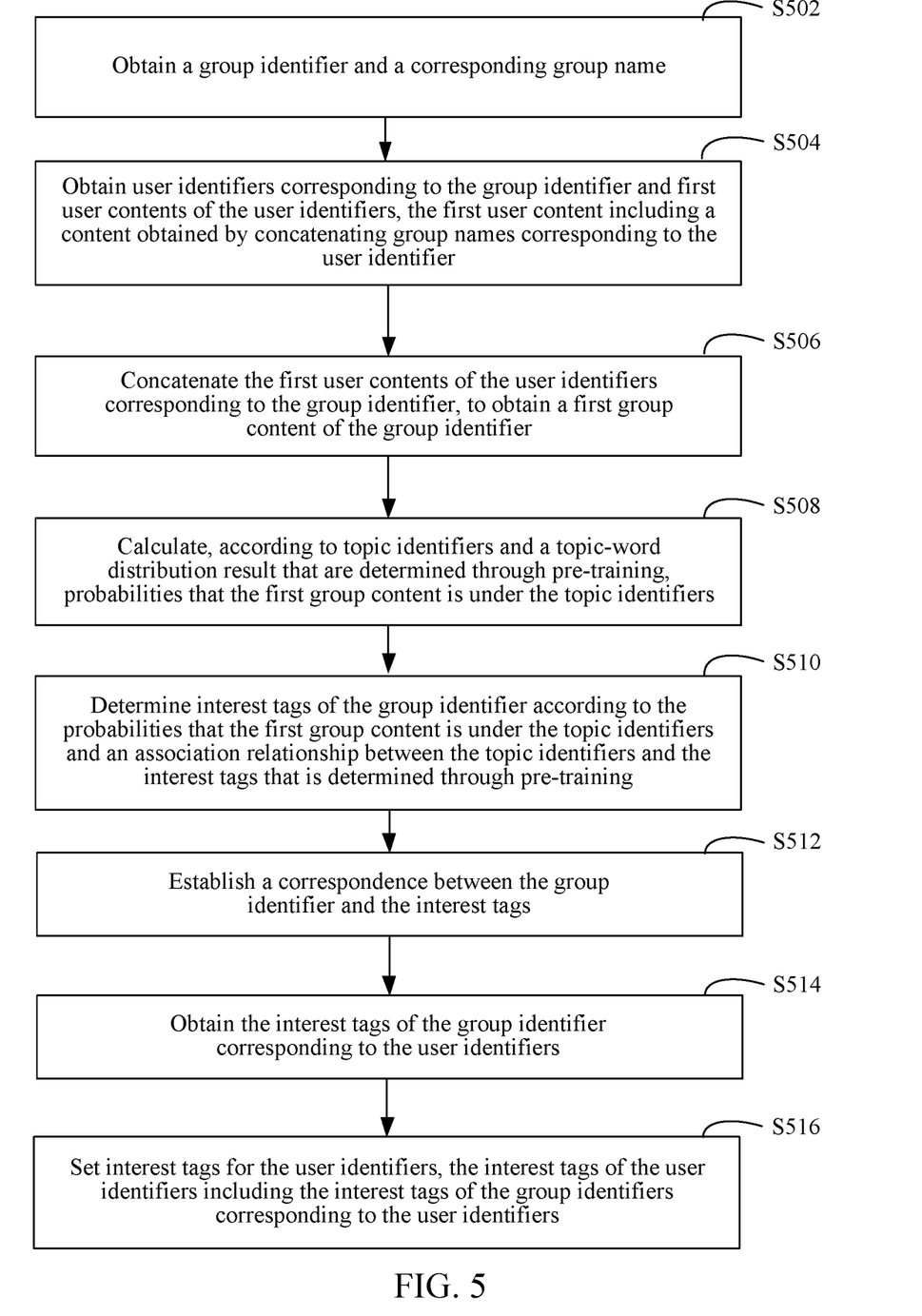
FIG. 5 is a flowchart of an interest tag determining method according to another embodiment.

In an embodiment, as shown in FIG. 5, an interest tag determining method includes steps of:

S502: Obtain a group identifier and a corresponding group name.

The group identifier is used to distinguish between different groups. The group identifier may be a group ID. The group name is a name that is set by a creator or a group administrator for a group and that is used for representing a group member relationship or a group purpose. The group ID of the group corresponds to the group name. For a group for which no group name is set, a corresponding group name is none, or a default group name of the group may be a group ID.

A manner of triggering the obtaining a group identifier and a corresponding group name may be that when it is detected that a new group is established, or when it is detected that a new member joins a group or a member exits the group, or when it is detected that a specified time of updating interest tags reaches. In a specific implementation, a system is set to regularly update interest tags of a group automatically, for example, automatically update the interest tags every month. When it is detected that the time of automatically updating reaches, the group identifier and the corresponding group name are obtained.

S504: Obtain user identifiers corresponding to the group identifier and first user contents of the user identifiers, the first user content including a content obtained by concatenating group names corresponding to the user identifier.

The group identifier of the group corresponds to the user identifiers of members in the group. The user identifier may be a user ID. The user identifiers corresponding to the group identifier include a user identifier of each member joining the group in the group. Each user identifier has corresponding first user content. The first user content includes the content obtained by concatenating the group names corresponding to the user identifier. The group names corresponding to the user identifier are group names of all group identifiers corresponding to the user identifier, and may be understood as group names of all groups that a user joins.

S506: Concatenate the first user contents of the user identifiers corresponding to the group identifier, to obtain a first group content of the group identifier.

Specifically, a first group content of a group includes first user contents of all users corresponding to a group identifier, namely, first user contents of all users joining the group. A first user content of a user includes group names of all groups that the user joins. The first group content includes group names of all groups that each user in the group joins.

S508: Calculate, according to topic identifiers and a topic-word distribution result that are determined through pre-training, probabilities that the first group content is under the topic identifiers.

The topic identifiers may be IDs of topics. The topic identifiers and the topic-word distribution result are obtained through pre-training. A specific training manner may be training by using a topic model. The topic-word distribution result is a probability of each word distributed under each topic. Probabilities that the first group content is under the topic identifiers are calculated by using the topic identifiers and the topic-word distribution result that are determined through pre-training.

S510: Determine interest tags of the group identifier according to the probabilities that the first group content is under the topic identifiers and an association relationship between the topic identifiers and the interest tags that is determined through pre-training.

The interest tags are used for representing content in which group members may be interested. The association relationship between the topic identifiers and the interest tags is also determined through pre-training. Specifically, the interest tags may be determined according to a word distribution result under each topic identifier. The interest tags of the group identifier corresponding to the first group content can be determined according to the probabilities that the first group content is under the topic identifiers and a relationship between the topic identifiers and the interest tags.

In a specific implementation, according to the probabilities that the first group content is under the topic identifiers, an interest tag corresponding to a topic identifier having a highest probability is used as an interest tag of the group identifier corresponding to the first group content. It may be understood that the interest tag of the group identifier may be used as an interest tag of each member in the group.

S512: Establish a correspondence between the group identifier and the interest tags.

To be specific, the corresponding interest tags are stored for the group identifier.

S514: Obtain the interest tags of the group identifier corresponding to the user identifiers.

Specifically, based on a correspondence between a user identifier and a group identifier and according to the user identifier, a group identifier corresponding to the user identifier is obtained, namely, a group identifier of a group that the user joins. Based on the correspondence between the group identifier and the interest tags, corresponding interest tags are obtained, namely, interest tags of all the groups that the user joins.

S516: Set interest tags for the user identifiers, the interest tags of the user identifiers including the interest tags of the group identifiers corresponding to the user identifiers.

Specifically, the interest tags of the user identifiers are interest tags of groups that the user identifiers join. It may be understood that users in the same group have at least one same interest tag. According to the group identifier corresponding to the user identifiers, an interest tag may be set for each user. Specifically, according to the user identifiers, the correspondence between the user identifier and the group identifier, and the correspondence between the group identifier and the interest tags, all group identifiers corresponding to the user identifiers and the interest tags of the group identifiers are obtained. Interest of users includes the interest tags of all the group identifiers corresponding to the user identifiers.

According to the interest tag determining method, the interest tags are set for the users. In the method, when there is no group remark and group description, names of all groups that users in a group join are concatenated, to enlarge group-related information amount, and further infer an interest tag of the group according to obtained information.

Based on the foregoing interest tag determining method, after the interest tag of the user is obtained, guidance can be provided for accurately promoting information for the user based on the interest tag. For example, advertisement information corresponding to the interest tag is recommended for the user according to the interest tag of the user.

In an embodiment, a computer device is further provided. An internal structure of the computer device may be shown in FIG. 2. The computer device includes an interest tag determining apparatus. The interest tag determining apparatus includes modules. Each module may be all or partially implemented by using software, hardware, or a combination thereof.

Figure 6:
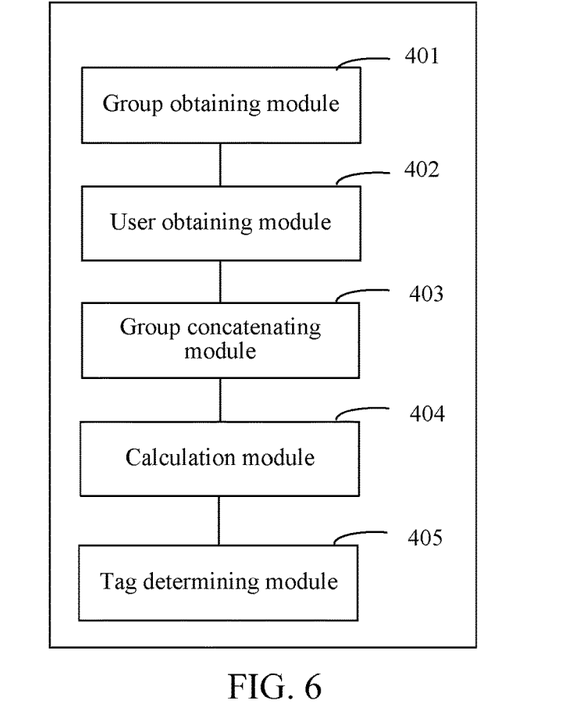
FIG. 6 is a structural block diagram of an interest tag determining apparatus according to an embodiment.

As shown in FIG. 6, the interest tag determining apparatus includes: a group obtaining module 401, a user obtaining module 402, a group concatenating module 403, a calculation module 404, and a tag determining module 405.

The group obtaining module 401 is configured to obtain a group identifier and a corresponding group name.

The user obtaining module 402 is configured to obtain user identifiers corresponding to the group identifier and first user contents of the user identifiers, the first user content including a content obtained by concatenating group names corresponding to the user identifier.

The group concatenating module 403 is configured to concatenate the first user contents of the user identifiers corresponding to the group identifier, to obtain a first group content of the group identifier.

The calculation module 404 is configured to calculate, according to topic identifiers and a topic-word distribution result that are determined through pre-training, probabilities that the first group content is under the topic identifiers.

The tag determining module 405 is configured to determine interest tags of the group identifier according to the probabilities that the first group content is under the topic identifiers and an association relationship between the topic identifiers and the interest tags that is determined through pre-training.

In the foregoing interest tag determining apparatus, the group names of all the group identifiers corresponding to the user identifier are concatenated to obtain the first user content corresponding to the user identifier. The first user contents of all the user identifiers corresponding to the group identifier are concatenated to obtain the first group content. The first group content is obtained by concatenating the group names of all the groups that each member in the group joins, thereby enlarging an amount of information used for representing a group content. Based on this, based on the group content after the amount of information is enlarged, the probabilities that the first group content is under the topic identifiers are calculated by using the topic identifiers and the topic-word distribution result that are determined through pre-training, and a range of topic identifiers to which the group may belong is widened. Further, according to the calculated probabilities and the association relationship between the topic identifiers and the interest tags that is determined through pre-training, the interest tags of the group identifier are accurately determined in a plurality of possible topics. The interest tags can represent interest content of the group. Further, information is accurately promoted for users in the group based on the interest tags of the group.

Figure 7:
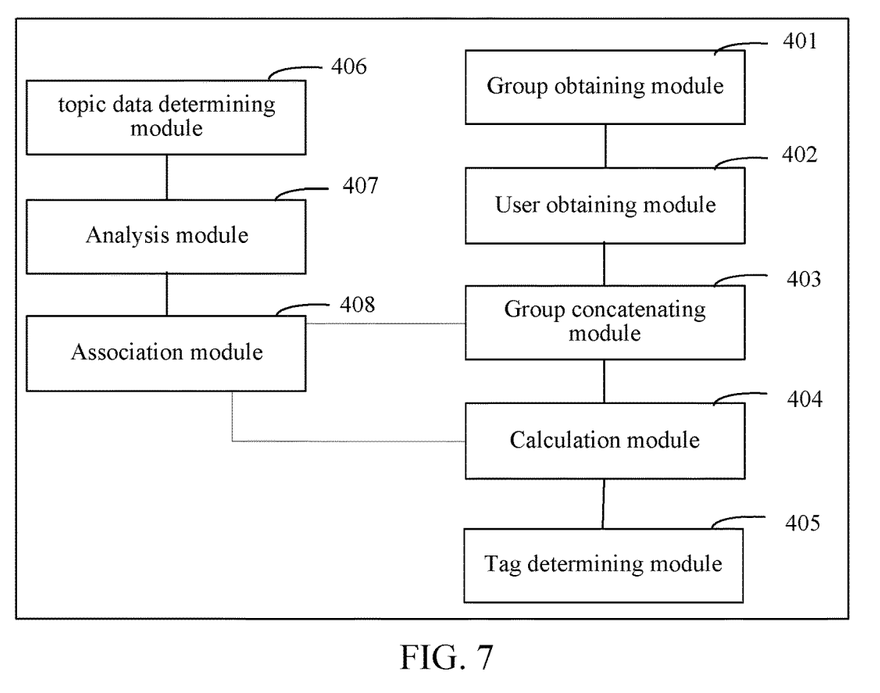
FIG. 7 is a structural block diagram of an interest tag determining apparatus according to another embodiment.

In an embodiment, as shown in FIG. 7, the interest tag determining apparatus further includes a topic quantity determining module 406, an analysis module 407, and an association module 408.

The group obtaining module 401 is further configured to obtain group identifiers meeting a preset condition and corresponding group names.

The user obtaining module 402 is further configured to obtain second user contents of user identifiers corresponding to each group identifier, the second user content including a content obtained by concatenating group names corresponding to the user identifier.

The group concatenating module 403 is further configured to concatenate the second user contents of the user identifiers corresponding to each group identifier, to obtain a second group content of the group identifier.

The topic quantity determining module 406 is configured to determine a target quantity of topics.

The analysis module 407 is configured to analyze each second group content by using a topic model, to obtain a topic-word distribution result under each topic identifier corresponding to the quantity of topics, the topic-word distribution result including a distribution probability that each word is under each topic.

The association module 408 is configured to determine, according to the topic-word distribution result, the topic identifiers, the association relationship between the topic identifiers and the interest tags, and the topic-word distribution result that are related to interest.

In another embodiment, the calculation module 404 includes a sampling calculation module and a counting module.

The sampling calculation module is configured to sample, according to the topic identifiers and the topic-word distribution result, a topic identifier to which each word in the first group content belongs.

The counting module is configured to count a quantity of times that each word appears under each topic identifier, to obtain the probabilities that the first group content is under the topic identifiers.

In another embodiment, the tag determining module 405 includes an extraction module and a group tag determining module.

The extraction module is configured to extract topic identifiers corresponding to first N largest probabilities, and obtain interest tags related to the topic identifiers corresponding to the first N largest probabilities.

The group tag determining module is configured to establish a correspondence between the N interest tags and the group identifier, and determine the N interest tags as the interest tags of the group identifier.

In another embodiment, the tag determining module 405 is further configured to obtain the interest tags of the group identifier corresponding to the user identifiers, and set interest tags for the user identifiers, the interest tags of the user identifiers including interest tags of all the group identifiers corresponding to the user identifiers.

According to the interest tag determining apparatus, the interest tags are set for the users. In these embodiments, when there is no group remark and group description, names of all groups that users in a group join are concatenated, to enlarge group-related information amount, and further infer an interest tag of the group according to obtained information.

Based on the foregoing interest tag determining apparatus, after the interest tags of the user are obtained, based on the interest tags, it should be understood that the steps in the embodiments of this application are not necessarily sequentially performed in an order indicated by step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer program instructing relevant hardware. The program may be stored in a non-volatile computer readable storage medium. When the program runs, the processes of the foregoing methods in the embodiments are performed. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache memory. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM), and the like.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be topic to the appended claims.

What is claimed is:

1. An interest tag determining method, the method comprising:
    pre-training a computer device with a Latent Dirichlet Allocation (LDA) model and existing group content to determine a plurality of topic identifiers and a topic-word distribution result;
    obtaining, by a computer device, a group identifier and a corresponding group name of a group of a plurality of groups, each group of the plurality of groups having an associated one of a plurality of group names;
    obtaining, by the computer device, a plurality of user identifiers of a plurality of users that joined the group, the plurality of user identifiers corresponding to the group identifiers;
    obtaining, by the computer device, a plurality of first user contents corresponding to the plurality of user identifiers, each first user content associated with a respective one of the plurality of users, each first user content comprising a respective set of one or more group names of the plurality of group names that an associated user joined;
    determining, by the computer device, a first group content by concatenating the respective sets of one or more group names from the plurality of first user contents;
    calculating, by the computer device according to the plurality of topic identifiers and the topic-word distribution result determined through pre-training, probabilities that the first group content is under the plurality of topic identifiers;
    determining, by the computer device, interest tags of the group identifier according to the probabilities that the first group content is under the plurality of topic identifiers and an association relationship between the plurality of topic identifiers and the interest tags; and
    transmitting, by the computer device, advertisement information corresponding to the interest tags to a user terminal of one of the plurality of users that joined the group, the computer device transmitting the advertisement information over a network connection established between the computer device and the user terminal.

2. The method according to claim 1, wherein pre-training the computer device with the LDA model and the existing group content to determine the plurality of topic identifiers and the topic-word distribution result comprises:
    obtaining, by the computer device, a plurality of group identifiers meeting a preset condition and that correspond to the plurality of group names;
    obtaining, by the computer device, second user contents of the plurality of user identifiers corresponding to each group identifier, the second user content comprising a content obtained by associating group names corresponding to the user identifier;
    associating, by the computer device, the second user contents of the plurality of user identifiers corresponding to each group identifier, to obtain a second group content of the group identifier;
    determining, by the computer device, a target quantity of topics;
    analyzing, by the computer device, each second group content by using the LDA model, to obtain the topic-word distribution result under each topic identifier of the plurality of topic identifiers corresponding to the target quantity of topics, the topic-word distribution result comprising a distribution probability that each word is under each topic; and
    determining, by the computer device according to the topic-word distribution result, the plurality of topic identifiers, the association relationship between the plurality of topic identifiers and the interest tags, and the topic-word distribution result that are related to interest.

3. The method according to claim 1, wherein calculating the probabilities that the first group content is under the plurality of topic identifiers comprises:
    sampling, by the computer device according to the plurality of topic identifiers and the topic-word distribution result, a topic identifier to which each word in the first group content belongs; and counting, by the computer device, a quantity of times that each word appears under each topic identifier, to obtain the probabilities that the first group content is under the plurality of topic identifiers.

4. The method according to claim 1, wherein determining the interest tags of the group identifier comprises:

extracting, by the computer device, N topic identifiers of the plurality of topic identifiers corresponding to a first N largest probabilities of the probabilities, and obtaining N interest tags related to the N topic identifiers corresponding to the first N largest probabilities; and establishing, by the computer device, a correspondence between the N interest tags and the group identifier, and determining the N interest tags as the interest tags of the group identifier.

5. The method according to claim 1, wherein after determining the interest tags of the group identifier, the method further comprises:

obtaining, by the computer device, the interest tags of the group identifier corresponding to the plurality of user identifiers; and setting, by the computer device, interest tags for the plurality of user identifiers, the interest tags of the plurality of user identifiers comprising the interest tags of the group identifier corresponding to the plurality of user identifiers.

6. A computer device comprising:

a memory storing a plurality of computer readable instructions:

a processor configured to execute the plurality of computer readable instructions, and upon execution of the plurality of computer readable instructions, is configured to:

pre-train with a Latent Dirichlet Allocation (LDA) model and existing group content to determine a plurality of topic identifiers and a topic-word distribution result;

obtain a group identifier and a corresponding group name of a group of a plurality of groups, each group of the plurality of groups having an associated one of a plurality of group names;

obtain a plurality of user identifiers of a plurality of users that joined the group, the plurality of user identifiers corresponding to the group identifier;

obtain a plurality of first user contents corresponding to the plurality of user identifiers, each first user content associated with a respective one of the plurality of users, each first user content comprising a respective set of one or more group names of the plurality of group names that an associated user joined;

determine a first group content by concatenation of the respective sets of one or more group names from the plurality of first user contents;

calculate, according to the plurality of topic identifiers and the topic-word distribution result determined through the pre-training, probabilities that the first group content is under the plurality of topic identifiers;

determine interest tags of the group identifier according to the probabilities that the first group content is under the plurality of topic identifiers and an association relationship between the plurality of topic identifiers and the interest tags; and transmit advertisement information corresponding to the interest tags to a terminal device of one of the plurality of users that joined the group, the advertisement information transmitted over a network established between the computer device and the user terminal.

7. The computer device according to claim 6, wherein in order to pre-train with the LDA model and the existing group content, the processor, upon execution of the plurality of computer readable instructions, is configured to:

obtain a plurality of group identifiers meeting a preset condition and that correspond to the plurality of group names;

obtain second user contents of the plurality of user identifiers corresponding to each group identifier, the second user content comprising a content obtained by associating group names corresponding to the user identifier;

associate the second user contents of the plurality of user identifiers corresponding to each group identifier, to obtain a second group content of the group identifier;

determine a target quantity of topics;

analyze each second group content by using the LDA model, to obtain the topic-word distribution result under each topic identifier of the plurality of topic identifiers corresponding to the target quantity of topics, the topic-word distribution result comprising a distribution probability that each word is under each topic; and determine, according to the topic-word distribution result, the plurality of topic identifiers, the association relationship between the plurality of topic identifiers and the interest tags, and the topic-word distribution result that are related to interest.

8. The computer device according to claim 6, wherein in order to calculate the probabilities that the first group content is under the plurality of topic identifiers, the processor, upon execution of the plurality of computer readable instructions, is configured to:

sample, according to the plurality of topic identifiers and the topic-word distribution result, a topic identifier to which each word in the first group content belongs; and count a quantity of times that each word appears under each topic identifier, to obtain the probabilities that the first group content is under the plurality of topic identifiers.

9. The computer device according to claim 6, wherein in order to determine the interest tags of the group identifier, the processor, upon execution of the plurality of computer readable instructions, is configured to:

extract N topic identifiers of the plurality of topic identifiers corresponding to a first N largest probabilities, and obtain N interest tags related to the plurality of topic identifiers corresponding to the first N largest probabilities; and establish a correspondence between the N interest tags and the group identifier, and determine the N interest tags as the interest tags of the group identifier.

10. The computer device according to claim 6, wherein after determining the interest tags of the group identifier, the processor, upon execution of the plurality of computer readable instructions, is further configured to:

obtain the interest tags of the group identifier corresponding to the plurality of user identifiers; and set interest tags for the user identifiers, the interest tags of the plurality of user identifiers comprising the interest tags of the group identifier corresponding to the plurality of user identifiers.

11. A non-transitory memory unit configured to store instructions that, when executed by processing circuitry of a computer device, causes the processing circuitry to:
- pre-train with a Latent Dirichlet Allocation (LDA) model and existing group content to determine a plurality of topic identifiers and a topic-word distribution result;
- obtain a group identifier and a corresponding group name of a group of a plurality of groups, each group of the plurality of groups having an associated one of a plurality of group names;
- obtain a plurality of user identifiers of a plurality of users that joined the group, the plurality of user identifiers corresponding to the group identifier;
- determine a first group content by concatenation of the respective sets of one or more group names from the plurality of first user contents;
- calculate, according to the plurality of topic identifiers and the topic-word distribution result determined through the pre-training, probabilities that the first group content is under the plurality of topic identifiers;
- determine interest tags of the group identifier according to the probabilities that the first group content is under the plurality of topic identifiers and an association relationship between the topic identifiers and the interest tags; and
- transmit advertisement information corresponding to the interest tags to a terminal device of one of the plurality of users that joined the group, the advertisement information transmitted over a network established between the computer device and the user terminal.

12. The non-transitory memory unit according to claim 11, wherein the instructions, when executed by the processing circuitry, and in order to cause the processing circuitry to pre-train with the LDA model and the existing group content, causes the processing circuitry to:
- obtain a plurality of group identifiers meeting a preset condition and that correspond to the plurality of group names;
- obtain second user contents of the plurality of user identifiers corresponding to each group identifier, the second user content comprising a content obtained by associating group names corresponding to the user identifier;
- associate the second user contents of the plurality of user identifiers corresponding to each group identifier, to obtain a second group content of the group identifier;
- determine a target quantity of topics;
- analyzing analyze each second group content by using the LDA model, to obtain the topic-word distribution result under each topic identifier of the plurality of topic identifiers corresponding to the target quantity of topics, the topic-word distribution result comprising a distribution probability that each word is under each topic; and
- determine, according to the topic-word distribution result, the plurality of topic identifiers, the association relationship between the plurality of topic identifiers and the interest tags, and the topic-word distribution result that are related to interest.

13. The non-transitory memory unit according to claim 11, wherein the instructions, when executed by the processing circuitry, and in order to calculate the probabilities that the first group content is under the plurality of topic identifiers, causes the processing circuitry to:
- sample, according to the plurality of topic identifiers and the topic-word distribution result, a topic identifier to which each word in the first group content belongs; and
- count a quantity of times that each word appears under each topic identifier, to obtain the probabilities that the first group content is under the plurality of topic identifiers.

14. The non-transitory memory unit according to claim 11, wherein the instructions, when executed by the processing circuitry, and in order to determine the interest tags of the group identifier, causes the processing circuitry to:
- extract N topic identifiers of the plurality of topic identifiers corresponding to a first N largest probabilities, and obtain N interest tags related to the plurality of topic identifiers corresponding to the first N largest probabilities; and
- establish a correspondence between the N interest tags and the group identifier, and determine the N interest tags as the interest tags of the group identifier.

15. The non-transitory memory unit according to claim 11, wherein after determining the interest tags of the group identifier, the instructions, when executed by the processing circuitry, further causes the processing circuitry to:
- obtain the interest tags of the group identifier corresponding to the plurality of user identifiers; and
- set interest tags for the user identifiers, the interest tags of the plurality of user identifiers comprising the interest tags of the group identifier corresponding to the plurality of user identifiers.

* * * * *